United States Patent [19]

Schuster

[11] Patent Number: 4,472,684

[45] Date of Patent: Sep. 18, 1984

[54] DEEP INVESTIGATION INDUCTION LOGGING WITH MIRROR IMAGE COIL ARRAYS

[75] Inventor: Nick A. Schuster, Houston, Tex.

[73] Assignee: Schlumberger Technology Corporation, Houston, Tex.

[21] Appl. No.: 482,674

[22] Filed: Apr. 6, 1983

Related U.S. Application Data

[63] Continuation of Ser. No. 171,687, Jul. 24, 1980, abandoned.

[51] Int. Cl.³ .................. G01V 3/28; G01V 11/00
[52] U.S. Cl. .................. 324/339; 73/152; 324/323
[58] Field of Search .......... 324/323, 335, 339–343

[56] References Cited

U.S. PATENT DOCUMENTS

| 2,582,314 | 1/1952 | Doll . | |
|---|---|---|---|
| 2,582,315 | 1/1952 | Doll . | |
| 2,790,138 | 4/1957 | Poupon . | |
| 3,067,383 | 12/1962 | Tanguy . | |
| 3,093,811 | 6/1963 | Schneider . | |
| 3,166,709 | 1/1965 | Doll . | |
| 3,180,141 | 4/1965 | Alger | 324/339 X |
| 3,191,141 | 6/1965 | Schuster . | |
| 3,259,837 | 7/1966 | Oshry | 324/339 |
| 3,329,889 | 7/1967 | Tanguy | 324/339 X |
| 3,397,356 | 8/1968 | Dumanoir | 324/339 X |
| 3,453,530 | 7/1969 | Attali . | |
| 3,493,849 | 2/1970 | Doll | 324/339 X |
| 3,500,683 | 3/1970 | Hoyle | 324/339 X |
| 3,609,518 | 9/1971 | Baker | 324/323 |

Primary Examiner—Gerard R. Strecker

[57] ABSTRACT

A sonde for induction logging of boreholes comprises a zero mutual inductance transmitter-receiver coil array comprising at least two coil groups that are time or frequency multiplexed. Each group comprises a coil array which is asymmetric and the coil array of one group are the mirror image of the coil array of the other group. The response of the sonde is obtained by combining the responses detected in several groups of receivers at different depths. Combination sondes, including those capable of performing both induction and sonic logging may be constructed.

13 Claims, 10 Drawing Figures

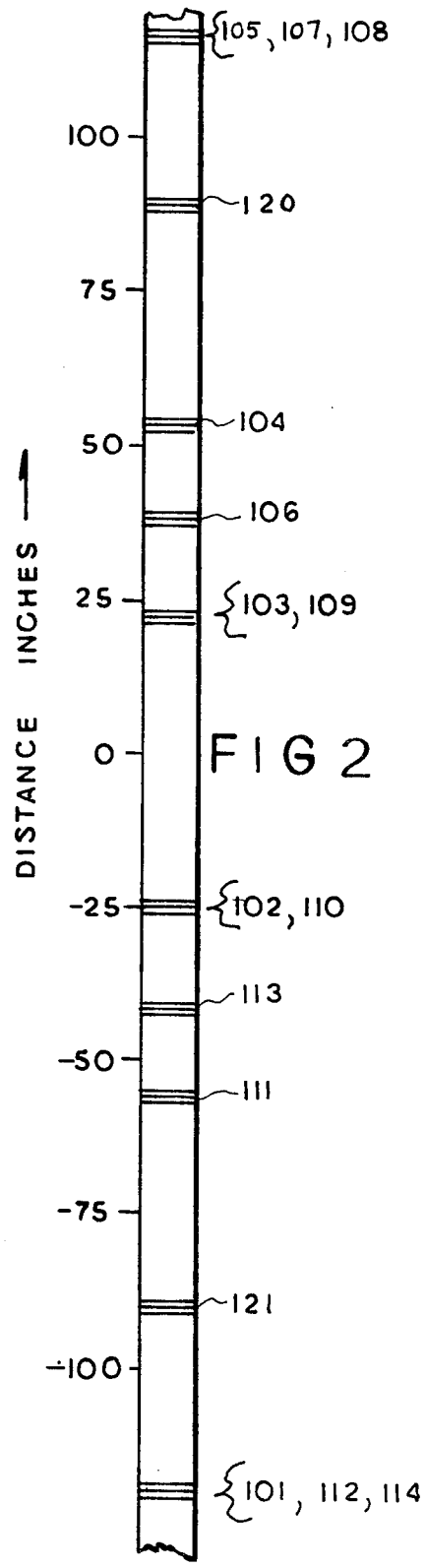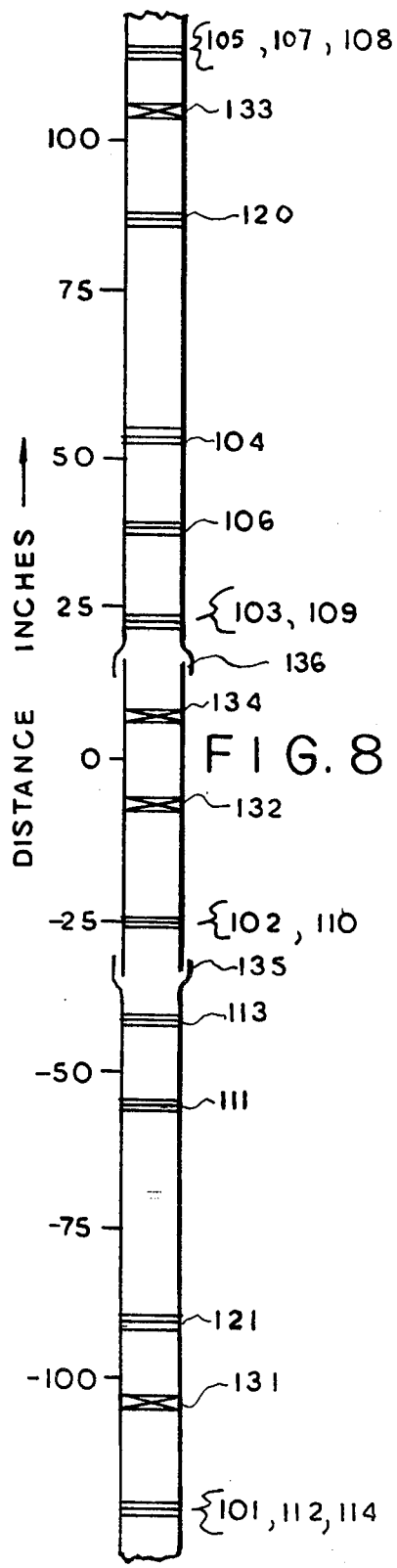

FIG. 3

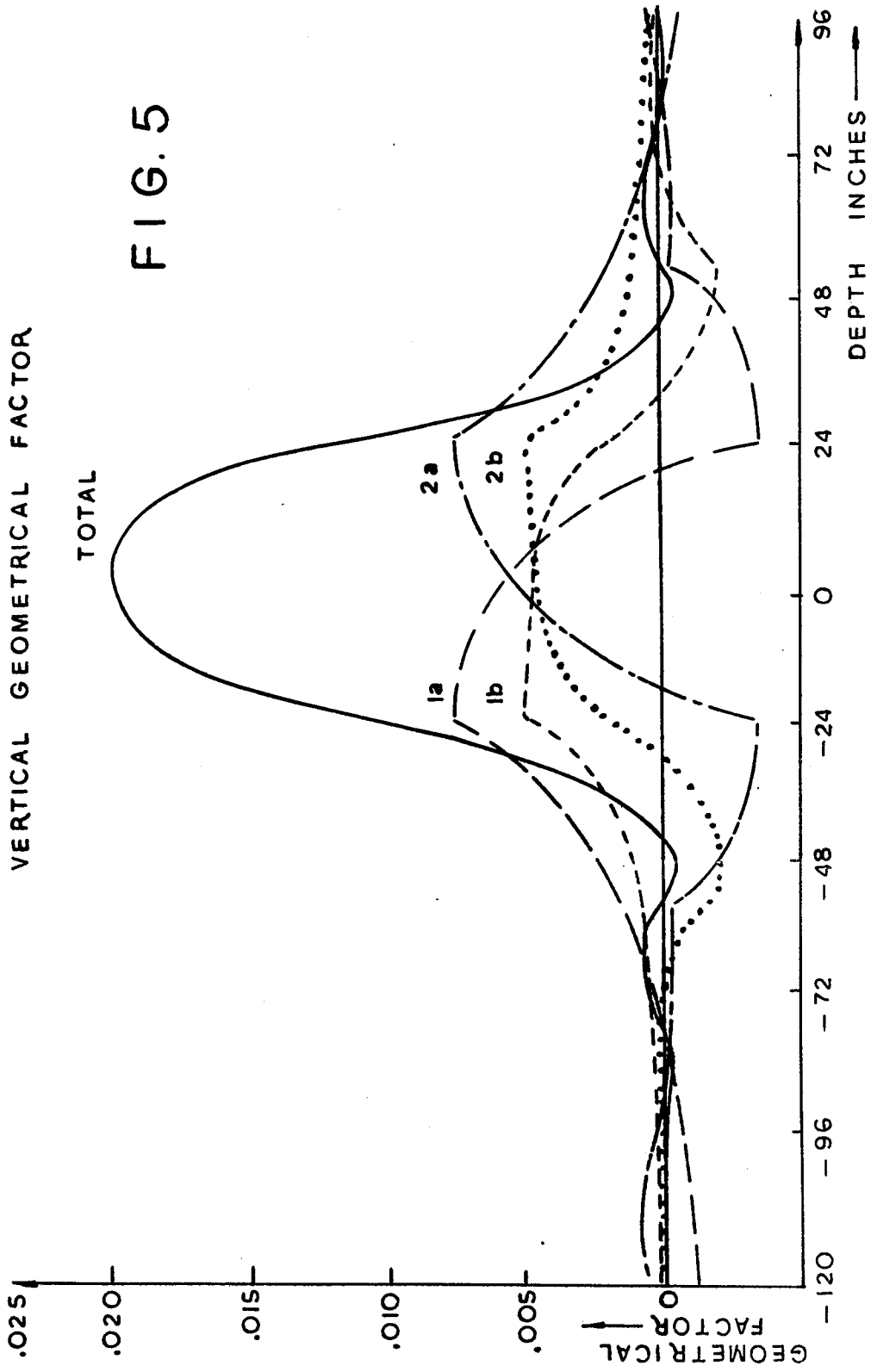

DEEP INVESTIGATION INDUCTION LOGGING WITH MIRROR IMAGE COIL ARRAYS

This is a continuation of Application Ser. No. 171,687 filed July 24, 1980, now abandoned.

BACKGROUND OF THE INVENTION

In the art of induction logging of boreholes, in which electromagnetic energy is transmitted into earth formations traversed by the borehole and the formation response to that transmitted energy is analyzed in order to measure the resistivity of the formation fluids, there has long been difficulty associated with the displacement of formation fluid by the drilling fluid. In porous and permeable formations, the pressure in the borehole forces the drilling fluid into a radial zone near the borehole, displacing formation fluids with drilling fluid having a different resistivity. Since the earliest patents pertaining to focussed coil systems for induction logging (U.S. Pat. Nos. 2,582,314 and 2,582,315, issued to H. G. Doll on Jan. 15, 1952) and incorporated herein by reference, the art has attempted to reduce the contribution to the tool response made by that part of the formation invaded by the drilling fluid ("invaded zone") and by formations above and below the region of interest. For example, U.S. Pat. No. 3,067,383, issued to D. R. Tanguy on Dec. 4, 1962 and incorporated herein by reference, discloses a sonde that has been very widely used in the industry and U.S. Pat. No. 2,790,138 issued to A. Poupon on Apr. 23, 1957 discloses the use of a plurality of electrically independent transmitter-receiver pairs arranged symmetrically about the same center point. The response of that tool is obtained by combining the responses of the several electrically independent pairs, these pairs being arranged in such a manner that contributions to the tool response from formation regions lying above or below the outermost coils and from the formation region close to the borehole are reduced.

It has been possible to combine an induction tool with a spontaneous potential measurement or with a pad-type device, but it has not been possible in the prior art to combine in close proximity an induction tool with a tool measuring a different parameter of the formation, such as porosity or radioactivity. In the prior art, separate tools have been stacked vertically, with other tools being located a considerable distance above the induction tool. This arrangement has the considerable disadvantage that the bottom of the well will not be logged by all tools, so that in order to obtain more than one log of a target zone on the same pass through the well, the borehole must be drilled past the target zone.

SUMMARY OF THE INVENTION

The present invention relates to a method and apparatus in which a signal indicative of the true resistivity of the formation is formed by combining the responses from at least two electrically independent transmitter-receiver coil groups that are not centered about the same point but overlap vertically so that the response curve of a lower portion of one array overlaps the corresponding response curve of an upper portion of another array.

In a preferred embodiment of the invention, a composite coil array is obtained by the super position of several sub-arrays so that two or more coils may be effectively located at the same depth. It is an advantageous feature of one embodiment of the invention that the sum of the mutual inductances to all coils at the same depth in the composite array is substantially zero. This zero mutual inductance property aids in the suppression of borehole effects and is more important for those individual coils that have a large mutual inductance.

Another feature of the invention is the use of a plurality of transmitter-receiver coil groups that have substantial mutual inductance but which, when responses from the arrays at different depths are combined, produce a total response characteristics of an equivalent array having zero mutual inductance.

Yet another feature of the invention is the construction of a combination tool capable of performing at least one measurement in addition to induction, in which the induction coils and the transducers used in the other measurement are closely combined.

DESCRIPTION OF THE DRAWINGS

FIG. 2 illustrates the coil arrangement of the preferred embodiment.

FIG. 3 illustrates the effective coil array after depth-shifting.

FIG. 5 illustrates the vertical geometrical factor for the preferred embodiment and for its component transmitter-receiver arrays.

FIG. 8 illustrates schematically a coil array with a set of sonic transducers mounted in close proximity.

In FIG. 1, an overall view of an apparatus constructed according to the invention shows sonde 10 comprising a coil array 20 and electronics cartridge 19, being drawn through borehole 11. Borehole 11 penetrates permeable formation 12 having an invaded zone 13 into which drilling mud contained in the borehole has penetrated and a virgin zone into which mud filtrate has not penetrated. The virgin zone is characterized by a resistivity Rt which is what sonde 10 is designed to measure. Permeable formation 12 lies between impermeable formation 16, which does not permit the penetration of mud filtrate 14 and more-permeable formation 17 which has an invaded zone 13' at greater diameter than invaded zone 13. The function of sonde 10 is to measure the resistivity $R_t$ of the virgin zone with as little disturbance from invaded zone 13' and formations or regions 16 and 17 as possible.

Figure 1:
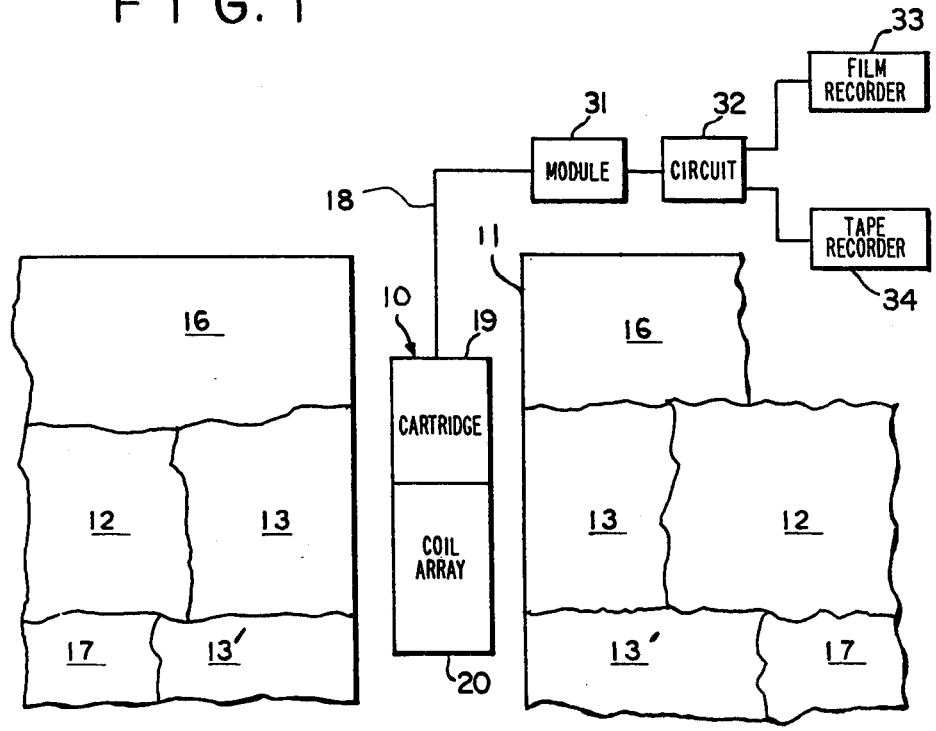
FIG. 1 displays a general view of a system including a sonde constructed according to the principles of the invention.

Sonde 10 is drawn through borehole 11 by means of cable 18, which is attached to a winch at the surface, the winch being omitted from the figure for better clarity. Cable 18 supports sonde 10, supplies electrical power and transmits signals between the sonde and the surface. At the surface, signals from the sonde are received in module 31, processed in circuit 32, displayed graphically in film recorder 33 and recorded on magnetic tape by recorder 34.

Figure 1A:
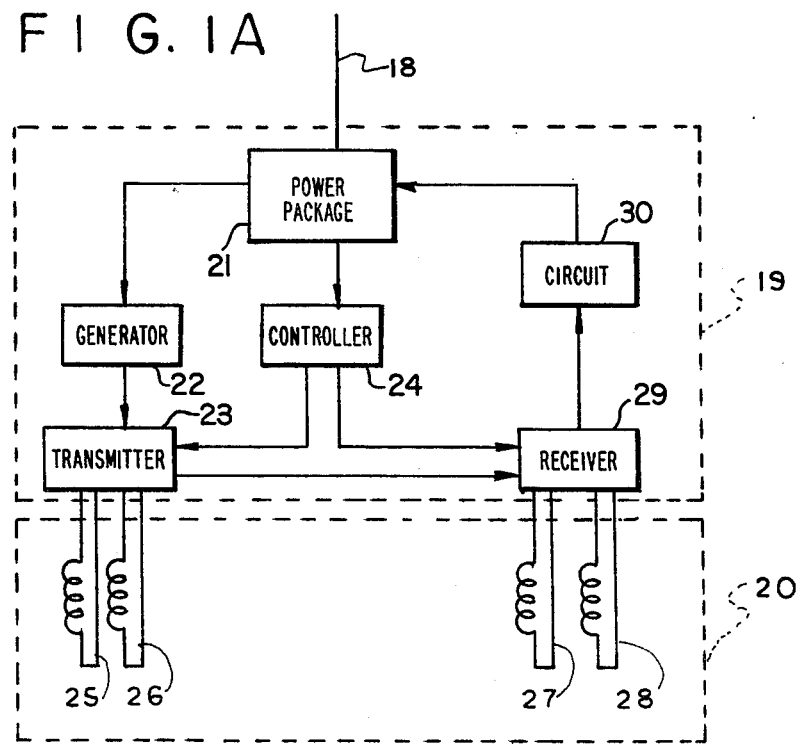
FIG. 1a illustrates the electronics portion of a preferred embodiment of the invention.

Within sonde 10, electronics package 19 contains circuits for transmitting to and receiving from the coil array 20 the electromagnetic signals that are used to probe the formations, together with circuits for controlling the transmitter and receiver and for interfacing with the cable. These electronic circuits are related as shown in FIG. 1a, in which electronics package 19, indicated by a dotted line, contains cable interface circuit 21, connected to cable 18, which receives controlling signals, such as start and stop commands, from the surface and electric power for the downhole electronics. Package 21 supplies power to signal generator 22, operating at a predetermined frequency chosen to reduce skin effect corrections. The signal from generator 22 is amplified in transmitter 23 and supplied alternately to one of transmitter coil arrays 25 and 26. Transmitter coil arrays 25 and 26 comprise one or more transmitter coils, according to the principles of the invention. The switching between arrays is regulated by controller 24, which is connected to interface circuits 21. Receiver coil arrays 27 and 28 detect signals produced by the formation in response to signals transmitted from transmitter coil arrays 25 and 26, respectively. Receiver 29 is also regulated by controller 24, in order that the response to each receiver coil array may be syncronized with the correct transmitter. Receiver 29 also receives a direct signal from transmitter 23 in order that conventional phase reference circuits within receiver 29 may separate the desired component of the signal emf that is in phase with the transmitter current from the large out-of-phase background that is always present in induction logging tools. Signals representing the amplitude of the in-phase emf from receiver coil arrays 27 and 28 are processed by circuit 30, illustratively a pair of voltage controlled oscillators and conventional associated circuits that produce two output signals of varying frequency, the frequency variations of which signals represent changes in the amplitudes of the received signals from the two transmitter-receiver combinations. The frequency ranges within which the output signals vary are chosen so that the signals may conveniently be transmitted up the cable and then separated at the surface. These output signals proceed to interface circuit 21, where they are transmitted to the surface. At the surface, module 31 separates the two output frequencies produced in circuit 30 and generates signals corresponding in amplitude with the signals detected from receiver coil arrays 27 and 28. Alternatively, the magnitude of the in-phase emf may be transmitted to the surface by conventional analog or digital telemetry.

In the preferred embodiment, the response of sonde 10 is formed by combining data taken at three different depths, as well as by combining the response from the two receiver arrays. This combination is done in module 32, which stores data temporarily and then adds together data taken at different depths in order to form the final output. It should be noted that the foregoing combination of signals from different depths should be distinguished from deconvolution of the signal, as taught in U.S. Pat. No. 3,166,709. Signal deconvolution may also be practiced in a tool constructed according to the principles of the present invention, in which case module 32 would be modified in a manner familiar to those skilled in the art.

It has been discovered that a combination of two-coil transmitter-receiver arrays having superior depth of investigation and suppression of adverse effects is that given in Table 1, in which TR is the product of transmitter and receiver turns, L is the spacing between the transmitters and receiver in inches and C is the location in inches of the midpoint beween transmitter and receiver, relative to the sonde center. There will be many ways of realizing a sonde having properties equivalent to the coil array listed in Table 1, an important consideration being that the array have substantially zero mutual inductance, so that sensitivity to borehole effects is minimized. Some mutual inductance may be corrected for by means of supplementary coils or transformers, as taught by U.S. Pat. No. 3,453,530 and a residual amount of mutual inductance may be tolerated.

TABLE 1

| Pair | TR | L | C |
| --- | --- | --- | --- |
| 1 | 10,000 | 112 | −32 |
| 2 | 10,000 | 112 | 32 |
| 3 | −7,000 | 206 | −15 |
| 4 | −7,000 | 206 | 15 |
| 5 | −3,657.14 | 64 | −56 |
| 6 | −3,657.14 | 64 | 56 |
| 7 | 1,511.38 | 48 | 0 |
| 8 | 268.57 | 34 | −71 |
| 9 | 268.57 | 34 | 71 |
| 10 | −184.49 | 30 | −39 |
| 11 | −184.49 | 30 | 39 |
| 12 | 21.62 | 30 | −103 |
| 13 | 21.62 | 30 | 103 |

A sketch of a preferred embodiment of a coil array, having two transmitters and fourteen receivers, that is equivalent to the thirteen-pair array listed in Table 1, is shown in FIG. 2, the number of turns, reference to FIG. 2, polarity and positions of the coils being listed in Table 2. The wiring between coils is conventional and is omitted from the figure for greater clarity. In this embodiment, there is a single signal generator that is time multiplexed between two transmitter coils, so that each transmitter coil interacts with only one set of receivers at a time. In operation, the first transmitting coil 120 is energized with alternating current of 4,000 HZ for a predetermined period. Receiver coils 101, 102, 103, 104, and 105, which are connected in series to form sub-array 1a, detect both a desired signal from the formation and an undesired signal directly from the transmitter. Conventional phase selecting circuitry in module 29 selects that component of the signal emf that is in phase with the transmitter current, the amplitude of which component is processed in circuit 30. A digital signal representing that amplitude is transmitted uphole by module 21. The same procedure is followed for receiver coils 106 and 107, which are connected in series to form sub-array 1b. The signals from sub-arrays 1a and 1b may be detected simultaneously or in sequence. Simultaneous measurement will require more down-hole circuitry and sequential measurement will require more time, and thus a slower logging speed. At the end of the predetermined period, transmitter 23 is connected to the transmitter coil 121 and signals are detected from sub-array 2a, comprising receiver coils 108, 109, 110, 111, and 112 and sub-array 2b, comprising receiver coils 113 and 114. Arrays 2a and 2b are connected in a manner similar to that of arrays 1a and 1b and the signals are detected in the same manner. Receiver arrays that are not in use are disabled so that they do not affect the signals from the arrays that are in use.

TABLE 2

| | Coil Reference in FIG. 2 | Location of Coil from Sonde Center (Inches) | Coil Turns |
|---|---|---|---|
| | $T_1$ | 120 | +88 | 100 |
| Group $1_a$ | $R_1$ | 101 | −118 | −70 |
| | $R_2$ | 102 | −24 | +100 |
| | $R_3$ | 103 | +24 | −36.5714 |
| | $R_4$ | 104 | +54 | +2.6857 |
| | $R_5$ | 105 | +118 | +.2162 |
| Group $1_b$ | $R_6$ | 106 | +40 | +7.5569 |
| | $R_7$ | 107 | +118 | −1.8449 |
| | $T_2$ | 121 | −88 | +100 |
| Group $2_a$ | $R_8$ | 108 | +118 | −70 |
| | $R_9$ | 109 | +24 | +100 |
| | $R_{10}$ | 110 | −24 | −36.5714 |
| | $R_{11}$ | 111 | −54 | +2.6857 |
| | $R_{12}$ | 112 | −118 | +.2162 |
| Group $2_b$ | $R_{13}$ | 113 | −40 | +7.5569 |
| | $R_{14}$ | 114 | −118 | −1.8449 |

The total response of the sonde is produced by combining responses from different receivers at three different depths. The apparent resistivity of the formation at depth Z is R(Z), which depends on the response of coil groups $1a$ and $2a$ at depth Z, the response of group $1b$ at depth Z+d and the response of group $2b$ at depth Z−d, this depth-shifting process being accomplished by storing the signals in memory circuits in module 32 and then performing the addition. In the preferred embodiment, the value of d is 64 inches. The effective location of the transmitter and receiver coils after depth-shifting is shown schematically in FIG. 3, in which it can be seen that there are effectively four coils located at a distance of plus and minus 24 inches from the center of the sonde. The combination of signals from groups $1a$ and $2a$ may be referred to as a first-stage signal and the total of all four groups may be referred to as a second-stage signal. The invention may be practiced with or without depth-shifting, but in the preferred embodiment, the improved response obtained by depth-shifting outweighs the complexity introduced thereby.

It would not be difficult to produce a sonde having a great depth of investigation by using a long spacing between main coils and then cancelling some of that response by having an opposite coil pair with a slightly smaller spacing to reduce borehole effects, but such a sonde would have very poor focussing properties in the vertical direction, so that bed edge boundaries would be obscured and thin beds would produce inaccurate responses.

The principles of the present invention permit the construction of sondes in which deep radial investigation is combined with superior vertical resolution, through the medium of overlapping reinforcing transmitter-receiver arrays that have a combined response having the beneficial properties of substantially zero mutual inductance. The radial and vertical properties of sondes constructed according to the invention may be varied very simply by scaling the spacing between coils, an operation that does not change the zero-mutual property. The preferred embodiment has been designed so that it has vertical properties similar to a commonly used sonde having the same vertical resolution but has less shoulder effect: the result of the present invention has been that the radial properties are very much superior. Alternatively, a sonde could be constructed with half the inter-coil spacing of the preferred embodiment and, as a result, essentially the same radial properties as a commonly used sonde and much better vertical properties. This alternative sonde would be useful in regions where it is important to locate thin beds and/or to locate bed boundaries accurately. A preferred frequency of operation for this alternative embodiment is 16,000 HZ. Compromise sondes having both radial and vertical properties superior to those presently available could also be constructed.

Figure 4:
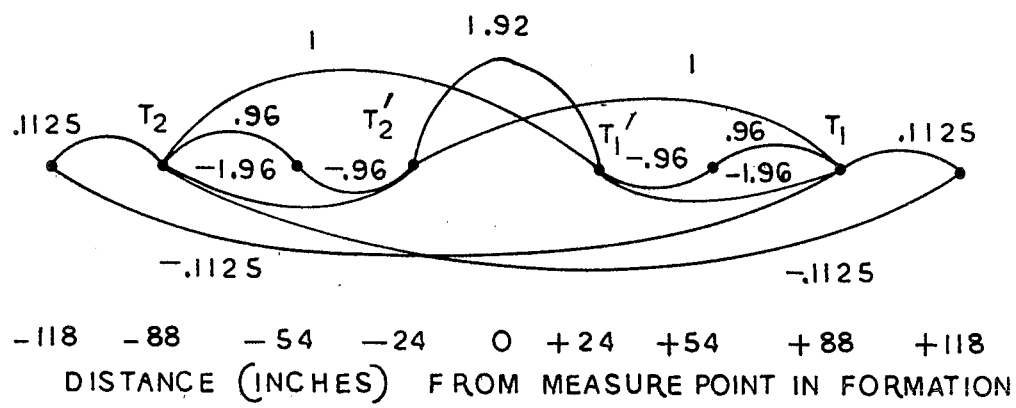
FIG. 4 illustrates a mutual inductance diagram after depth-shifting.

FIG. 4 illustrates the mutual inductance of the actual coil array after depth-shifting. The effective location of the transmitters is indicated by T's, the depth-shifting producing four effective transmitter locations for two actual transmitters. The relative magnitude of the mutual inductance between nodes of the diagram is indicated in FIG. 4 for each pair of interacting coils. It is apparent by inspection that the sum of the mutual inductances at all the nodes is zero. The inductances shown in FIG. 4 have been normalized for convenience so that the mutual inductance between T1 and R2 is taken to be unity. Referring back to FIG. 3, and considering the point at −24 inches as an example, it can be seen that, at that point, group $2b$ has a sum of inductances that equals 0 and that groups $1a$, $1b$ and $2a$ together combine to give zero mutual inductance. The first-stage signal made by combining the responses from sub-groups $1a$ and $2a$ (at the depth in the borehole corresponding to −24 inches) has a net mutual inductance. It is the combination of all four sub-groups that produces zero mutual inductance at the coil locations.

Beneficial results of the use of overlapping arrays and depth-shifting may be observed in FIG. 4. The main transmitter-receiver pairs (T1–R2 and T2–R9) are associated with the positive loops having a weight of +1 and the subsidiary coil pairs that help to cancel borehole effects (T1–R3 and T2–R10) are associated with the negative loops having a weight of −1.96. As is noted above, these four pairs are connected in two electrically independent groups that overlap. An advantageous feature of the overlap is that, near the sonde center between plus and minus 24 inches, the two arrays reinforce, thus combining the well-known beneficial effects of the suppression of borehole effects by cancellation between the larger and smaller-spaced coil pairs of each array with improved radial sensitivity by reinforcement of the net effect of the two electrically independent groups. Further, the positive loop with the weight 1.92 is placed at the sonde center by depth-shifting subsidiary arrays $1b$ and $2b$, thus achieving an additional positive reinforcement without disturbance of the beneficial zero-mutual property. In discussing the overlap feature, it is convenient to refer to the coils of group 1 from −24 inches to +118 inclusive as the upper portion of the first group and the coils of group 2 from +24 inches to −118 inches inclusive as the lower portion of the second group. Both groups extend from +118 inches to −118 inches.

In FIG. 5, the vertical geometrical factors for the four sub-groups of coils and their combination are displayed. It is evident by inspection of this figure that the upper portion of groups $1a$ and $1b$ combine with the lower portion of groups $2a$ and $2b$ within the overlap region and also that the net combination of the four groups combine to reduce sharply the response above and below the overlap region, thus advantageously reducing the shoulder effect and improving the vertical resolution. It may bear repeating that the curves labelled $1b$ and $2b$ represent the response of sub-groups $1b$ and $2b$ after depth-shifting and that the depth-shifting is not essential to the practice of the invention in its broadest form but is an improvement that permits coils to be effectively placed in locations that would be physically awkward without depth-shifting.

Although the preferred embodiment has the desirable zero-mutual property, that is not essential for the practice of the invention. An alternative embodiment of the invention eliminates the small coils $R_5$ and $R_{12}$ at the extreme ends of the sonde and adjusts slightly some other coil turn numbers, as is shown in Table 3. The effective length of coil groups 1 and 2 after depth-shifting is less than in the preferred embodiment, and the total length of the sonde is the same. There is also a small amount of residual mutual inductance. This alternate embodiment is not only simpler to construct, but also has the advantageous property of having a smoother response to the effect of a boundary between formations, one of which has a resistivity very much greater than the other, than does the preferred embodiment and it may be used in place of the preferred embodiment where the residual mutual inductance may be tolerated.

TABLE 3

| | Coil | Location of Coil from Sonde Center (Inches) | Coil Turns |
|---|---|---|---|
| | $T_1$ | +88 | 100 |
| Group $1_a$ | $R_1$ | −118 | −65 |
| | $R_2$ | −24 | +100 |
| | $R_3$ | +24 | −35.84 |
| | $R_4$ | +54 | 2.8632 |
| Group $1_b$ | $R_6$ | +40 | 7.33 |
| | $R_7$ | +118 | −1.7895 |
| | $T_2$ | −88 | +100 |
| Group $2_a$ | $R_8$ | +118 | −65 |
| | $R_9$ | +24 | +100 |
| | $R_{10}$ | −24 | −35.84 |
| | $R_{11}$ | −54 | 2.8632 |
| Group $2_b$ | $R_{13}$ | −40 | 7.33 |
| | $R_{14}$ | +118 | −1.7895 |

FIG. 5 shows normalized curves illustrating the vertical sensitivity of the preferred embodiment and its subsidiary arrays $1a$ and $2a$, which are fixed in relation to one another, and $1b$ and $2b$, which are depth-shifted. The several curves combine to reinforce sharply in the region between plus and minus twenty four inches from the sonde center, referred to as the investigation or overlap region, and combine to cancel above and below that region. As a result of this combination, the response of the sonde (and its characteristic response or sensitivity curves) is sharply peaked at the region of the formation that is at the same depth as the investigation region. It is evident that the response curves of the separate groups peak at different locations along the support members and that the several curves are vertically asymmetric. It is advantageous that the largest negative areas of these curves, which cancel corresponding positive areas, are those of the fixed arrays, which are not susceptible to errors from the depth-shifting process. Because of sticking of the sonde in the borehole and stretch in the cable, the response of the depth-shifted arrays $1b$ and $2b$ will be sometimes combined at an incorrect depth and the average response of the sonde will be somewhat degraded from that shown here.

Figure 6:
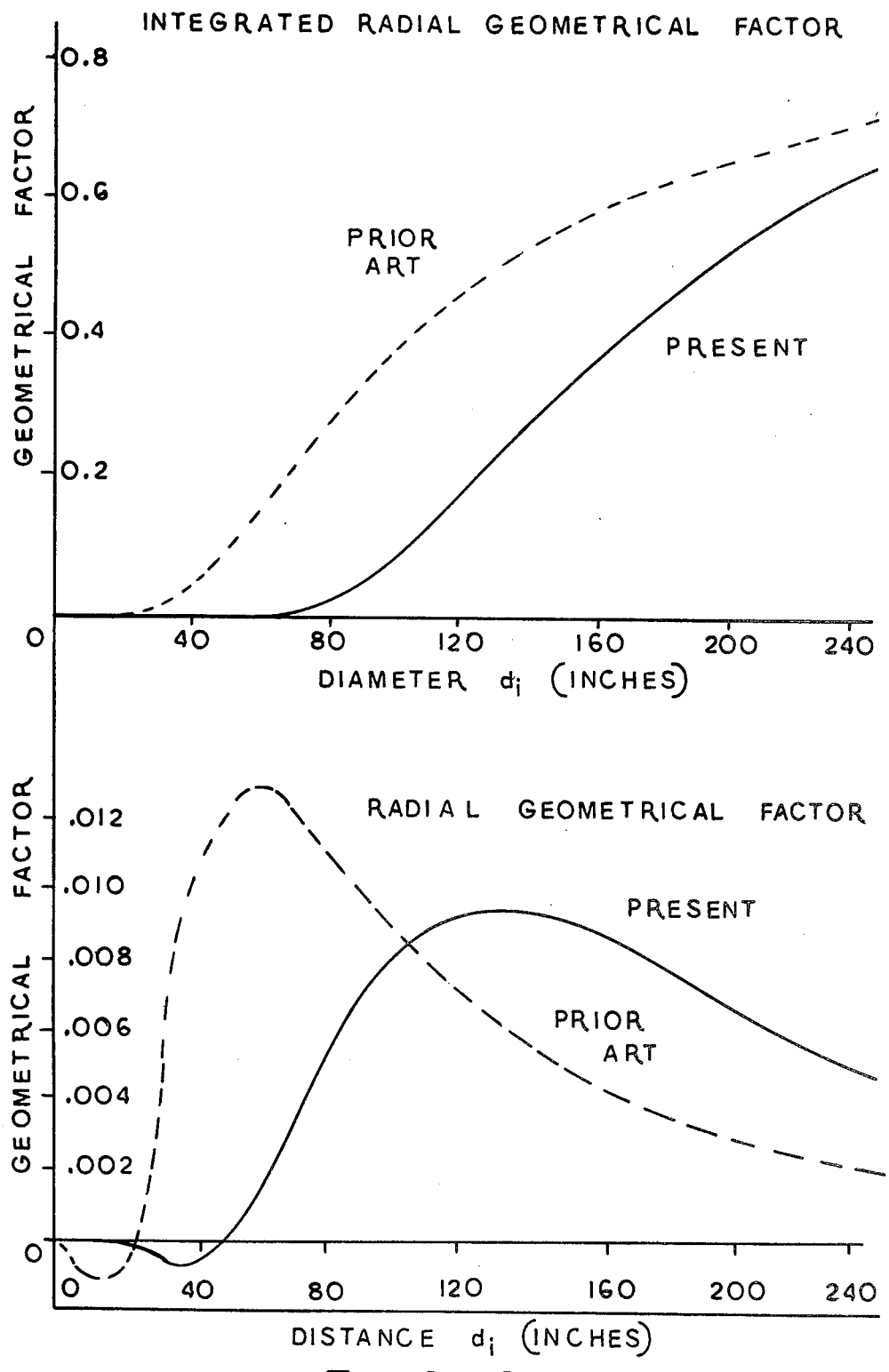
FIG. 6 illustrates the radial geometrical factor for the preferred embodiment.
Figure 7:
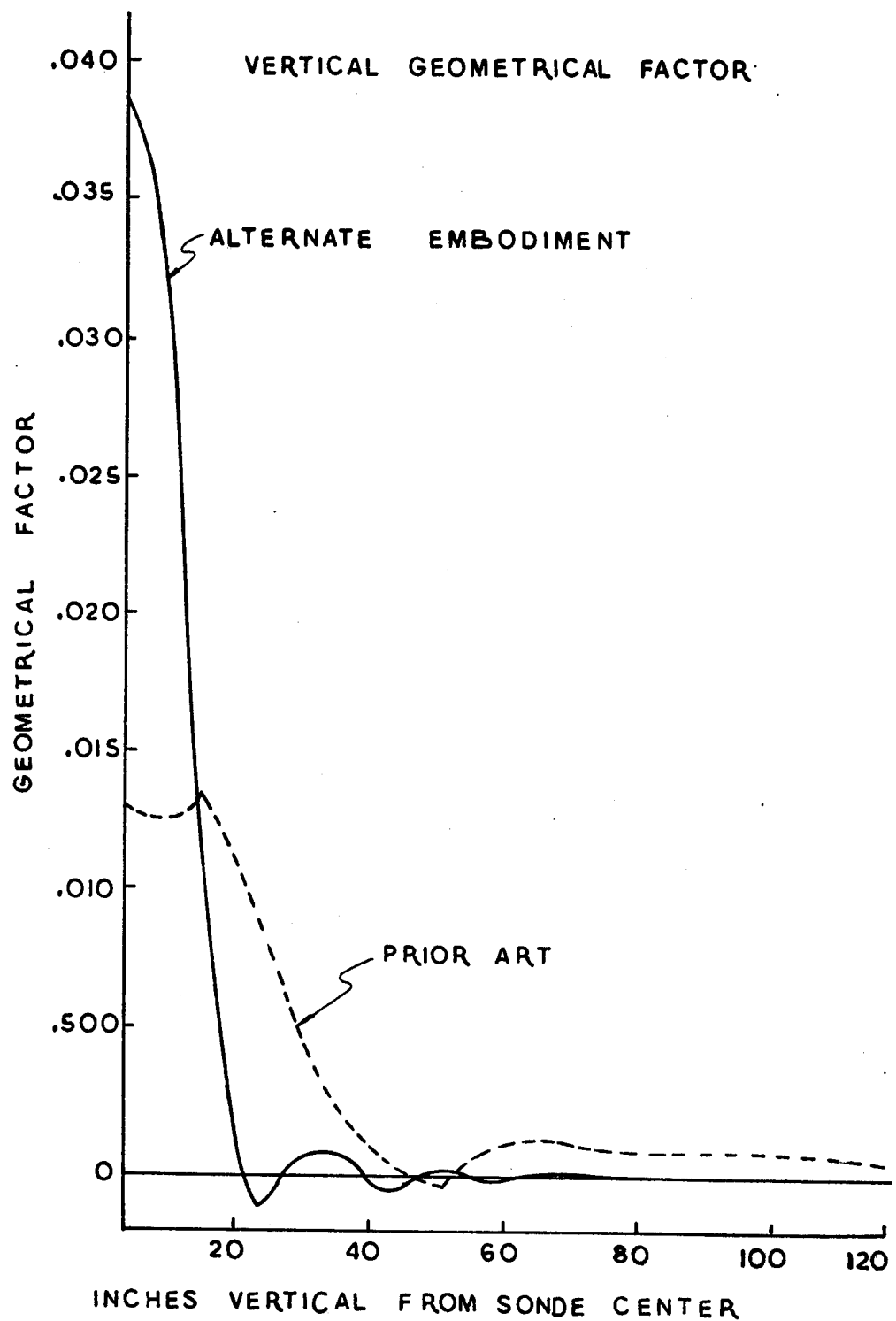
FIG. 7 illustrates the vertical geometrical factor for an alternative embodiment.

In FIG. 6, the radial geometrical factor of the preferred embodiment is compared with the factor for a commonly used sonde. The improved insensitivity to the borehole and invaded zone regions of the preferred embodiment is readily apparent. In FIG. 7, the vertical geometrical factor of the alternative embodiment is compared with that of the same commonly used sonde. Compromise sondes having dimensions between those shown in the two embodiments described and having intermediate properties will be readily apparent to those skilled in the art.

Referring again to FIG. 5, it is apparent that the invention involves the use of coil arrays that overlap on one side so that their response functions reinforce each other at the center of the sonde and cancel at the top and bottom. Arrays $1a$ and $1b$ alone would combine to produce a responsive having vertical dependence considerably less good than that of the total response of the sonde. If there were one transmitter-receiver array instead of two electrically independent arrays, the problem of suppressing the borehole effects by minimizing the mutual inductance would be much more severe. In this particular embodiment, both independent arrays have the same radial response, but that is not necessary for the practice of the invention in its broadest scope. It will be evident to those skilled in the art that independent overlapping arrays having different radial responses may be combined.

Another feature of the invention that appears in the preferred embodiment is the use of asymmetric arrays that are mirror images of one another to produce a combined response that is both symmetric and sharply focussed in the vertical direction.

The spacing between coils in the preferred embodiment is considerably greater than that in standard commercially used sondes and the frequency is lower, with the result that the receiver signal level in this embodiment will be reduced by a substantial factor compared with the prior art sonde used for comparison. This factor may be recovered by using low loss ferrite magnetic core in the coils, such as those made by the Magnetic Corporation, Butler, Pa., as indicated in Table 4.

TABLE 4

| Core | Coils |
|---|---|
| 201 | 101, 112, 114 |
| 202 | 122 |
| 203 | 111 |
| 204 | 113 |
| 205 | 102 and 110 |
| 206 | 103 and 109 |
| 207 | 106 |
| 208 | 104 |
| 209 | 121 |
| 210 | 105, 107, and 108 |

Because of the strong effect of the cores, it may be desirable to utilize two auxiliary circuits to cancel out some of the direct magnetic coupling between the transmitters and the cores that are nearby. For example, a small current accurately in phase with the current applied to transmitter 121 can be fed to small auxiliary coils wound on cores 206, 207, 208 and 210 and a similar current in phase with the current applied to transmitter 122 can be fed to coils wound on cores 201, 203, 204 and 205. The use of such small auxiliary circuits would improve the performance of the sonde in two ways: by cancelling the mutual inductance that would actually arise between the transmitters and the theoretically independent array and by cancelling the extra dipole moments caused by the magnetic cores that would otherwise perturb the magnetic fields.

The depth-shifting process may be dispensed with, either by use of a different combination of transmitter and receiver coils or by the inclusion of additional transmitter coils and associated receiver coils.

An embodiment might be constructed that employs a plurality of different frequencies and associated circuits to isolate the two arrays rather than the time-multiplexing of the illustrative embodiment. Such an embodiment would permit simultaneous measurement of both arrays and thus a faster logging speed.

It has previously not been possible to place a tool that measures a different physical parameter of the formation, such as porosity, in close proximity to an induction tool because the presence of metal distorts the electromagnetic field of the induction tool and produces a false signal.

In the foregoing discussion of a preferred embodiment of the invention, the two electrically independent transmitter-receiver arrays have each employed one transmitter and a number of receivers, with the use of depth-shifting to produce the equivalent of four transmitters. Modifications of this embodiment that come within the scope of the invention will be readily apparent to those skilled in the art. For example, a pair of overlapping arrays may be constructed that uses a single transmitter coil, to which different groups of receiver coils respond. Further, some receiver coils may be used for more than one array, being switched in and out of a circuit as required.

Conventional practice has been to mount another tool, such as a sonic tool, above an induction tool and separated from the center of the induction coil array by as much as twenty four feet. This arrangement has the considerable disadvantage that, in order to log a target formation on a single pass through the borehole, it is necessary to drill past that formation.

It has been found, however, that with the combination of the zero-mutual coil array and decreased sensitivity to borehole effects that is provided in a sonde constructed according to the present invention, it is possible to insert moderate amounts of metal within a moderate distance of the induction coils and thus that a sonic tool may be combined in close proximity with an induction tool. In FIG. 8, the coil array of FIG. 2 is shown, together with a set of sonic transmitters 131 and 133 and receivers 132 and 134. Advantageously, the sonic transducers will be of the ceramic type. The sonic tool in the illustrative embodiment is of the type described in U.S. Pat. No. 3,093,811, incorporated herein by reference.

Preferably, the sonic and induction tools will be operated in sequence in order to eliminate interference between the tools, although simultaneous operation with appropriate circuitry to reduce interference effects is possible and will result in a faster logging speed.

Figure 9:
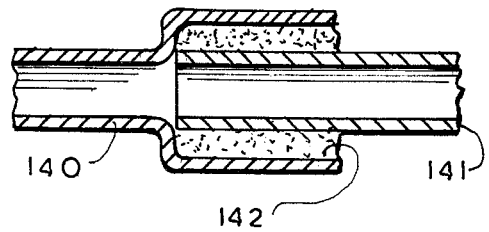
FIG. 9 illustrates a joint of the sonde shown schematically in FIG. 8.

The presence of the sonic tool imposes additional requirements on the mechanical construction of the sonde. Induction sondes conventionally include a non-conducting madrel, made of fiberglass or the like, to support the coils and enclose the wires connecting the coils. Sonic sondes conventionally employ a support for the sonic transducers (as shown in U.S. Pat. No. 3,191,141 issued to Nick Schuster) that is made of slotted steel, a conducting material, in order to increase the propagation or travel time of the sonic pulse and thus reduce interference between the desired signal from the formation and the undesired signal that propagates along the mandrel. A solution to the problem of combining these two requirements is shown in FIG. 8, in which the coil array is shown schematically, as in FIG. 2, along with additional sonic components. Sonic transmitters 131 and 133 are located symmetrically 108 inches from the sonde center and sonic receivers 132 and 134 are located symmetrically 12 inches from the sonde center. Acoustic damping is provided by two joints 135 and 136 located symmetrically 32 inches from the sonde center. Each joint is constructed as shown in cross section in FIG. 9, in which fiberglass section 141 is inserted in a flared end of fiberglass section 140, with a sound-attenuating filler substance 142, such as rubber, filling the space between sections 140 and 141.

I claim:

1. Induction logging apparatus for the electrical investigation of earth formations traversed by a borehole, comprising:

a support member;
   a plurality of transmitter and receiver coils mounted at predetermined positions along said support member and interconnected to form two electrically independent groups of coils, the coil groups having an asymmetric arrangement with respect to a predetermined location on said member and being in mirror image relationship one to each other, one coil group responding preferentially to formations located opposite a predetermined portion of said support member centered at said location and above said portion, the other coil group responding preferentially to formations located opposite and below said portion; and
   means for additively combining the respective outputs of the coil groups to produce a combined output, whereby the vertical sensitivity of the combined output is symmetrical with respect to said location and peaks at said location.

2. An apparatus according to claim 1, in which the receiver coils of said electrically independent transmitter-receiver coil groups are divided into at least two sub-groups of receiver coils, the signals from which sub-groups are separately detected and in which apparatus a combined output signal is formed by combining responses from said sub-groups.

3. An apparatus according to claim 2, in which an output signal from a first sub-group of said first group and an output signal from a first sub-group of said second group taken at a given depth are combined with an output signal from a second sub-group of said first group measured at a first depth related to said given depth by a first predetermined amount and an output signal from a second sub-group of said second group measured at a second depth related to said given depth by a second predetermined amount.

4. An apparatus according to claim 3, in which the combined mutual inductance of said electrically independent coil groups at said predetermined positions is approximately zero.

5. An apparatus according to claim 4, in which said at least two electrically independent transmitter-receiver coil groups are responsive to different frequencies.

6. An apparatus according to caim 4, in which said at least two electrically independent transmitter-receiver coil groups are energized in sequence.

7. An apparatus according to to claim 1, further comprising: a first plurality of sonic transducers for transmitting sonic pulses, a second plurality of sonic transducers for detecting sonic pulses, means for mounting said sonic transducers at predetermined locations along said support member where the mutual inductance of said plurality of transmitter and receiver coils is substantially zero, means for energizing said first plurality of sonic transducers, means for processing signals detected by said second plurality of sonic transducer to form a sonic output signal.

8. A well logging tool according to claim 7 in which said sonic transducers are located in such a manner that the formations concurrently investigated by said sonic transducers substantially correspond in depth to the formation investigated by said plurality of transmitter and receiver coils.

9. A well logging tool according to claim 8, in which said support member includes a plurality of non-conductive attenuating means for attenuating sonic energy radiated by said sonic transmitting transducers, said attenuating means being located on said support member between each of said sonic transmitting transducers and the nearest of said sonic detecting transducers.

10. A well logging tool according to claim 8, in which said support member includes a plurality of non-conductive delaying means for delaying sonic energy radiated by said sonic transmitting transducers, said delaying means being located on said support member between each of said sonic transmitting transducers and the nearest of said sonic detecting transducers.

11. Induction logging method for the electrical investigation of earth formations traversed by a borehole, comprising the steps of
displacing through the borehole a plurality of transmitter and receiver coils disposed at predetermined positions along a support member;
energizing the transmitter coils;
detecting the signals generated in the receiver coils, said detecting step being accomplished in a plurality of coils interconnected to form two electrically independent coil groups, one coil group responding preferentially to formations located opposite a predetermined portion of said support member and above that portion, the other group responding preferentially to formations located opposite said portion and below said portion, the vertical responses of the two coil groups being in mirror image relationship one to each other:
additively combining the outputs of said coil groups, whereby the combined output is preferentially responsive only to the formations located opposite said predetermined portion.

12. The method of claim 11 wherein said combining step includes the steps of:
storing the different outputs of said coil groups as measured at different displacements of the support member in the borehole, and
combining selected ones of said different outputs so as to provide a single output which is representative of the electrical properties of earth formations at a given displacement of the support member in the borehole.

13. The method according to claim 12, further including the steps of:
concurrently with said energizing step, emitting into the surrounding formations sonic impulses at points along the support member where the mutual inductance of the coils in zero, and
detecting the emitted sonic impulses at points along the support member where the mutual inductance of the coils is zero.

* * * * *